(12) United States Patent
Namioka

(10) Patent No.: US 8,218,076 B2
(45) Date of Patent: Jul. 10, 2012

(54) IMAGE DISPLAY APPARATUS, IMAGE SIGNAL PROCESSING APPARATUS, AND IMAGE SIGNAL PROCESSING METHOD

(75) Inventor: Toshiyuki Namioka, Tokorozawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1359 days.

(21) Appl. No.: 11/774,140

(22) Filed: Jul. 6, 2007

(65) Prior Publication Data

US 2008/0151102 A1    Jun. 26, 2008

(30) Foreign Application Priority Data

Dec. 25, 2006 (JP) ................. 2006-348122

(51) Int. Cl.
*H04N 11/20* (2006.01)
*G06K 9/40* (2006.01)

(52) U.S. Cl. ........................................ 348/452; 382/254
(58) Field of Classification Search ................ None
See application file for complete search history.

(56) References Cited

U.S. PATENT DOCUMENTS

| 5,019,903 | A | * | 5/1991 | Dougall et al. | ............... 348/448 |
| 6,144,412 | A | | 11/2000 | Hirano et al. | |
| 2002/0063807 | A1 | * | 5/2002 | Margulis | ....................... 348/745 |
| 2005/0089196 | A1 | * | 4/2005 | Gu et al. | ....................... 382/107 |

FOREIGN PATENT DOCUMENTS

| JP | 10145817 | 5/1998 |
| JP | 11112939 | 4/1999 |
| JP | 2005020761 | 1/2005 |
| JP | 2005192230 | 7/2005 |
| JP | 2005217970 | 8/2005 |
| JP | 2006227442 | 8/2006 |

* cited by examiner

*Primary Examiner* — Jefferey Harold
*Assistant Examiner* — Michael Teitelbaum
(74) *Attorney, Agent, or Firm* — Pillsbury Winthrop Shaw Pittman, LLP

(57) ABSTRACT

According to one embodiment, there is provided an image signal processing apparatus includes an interlace-to-progressive conversion circuit and a resolution enhancement circuit. The interlace-to-progressive conversion circuit outputs first signals by performing an interlace-to-progressive conversion process on image signals. The resolution enhancement circuit outputs second signals by performing a resolution enhancement process on the first signals. The resolution enhancement circuit performs the resolution enhancement process not on the first signals on which an interpolation process for dynamic images have been performed.

9 Claims, 3 Drawing Sheets

IMAGE DISPLAY APPARATUS, IMAGE SIGNAL PROCESSING APPARATUS, AND IMAGE SIGNAL PROCESSING METHOD

CROSS-REFERENCE TO RELATED APPLICATIONS

This application is based upon and claims the benefit of priority from Japanese Patent Application No. 2006-348122, filed Dec. 25, 2006, the entire contents of which are incorporated herein by reference.

BACKGROUND

1. Field

An aspect of the present invention relates to an image display apparatus, an image signal processing apparatus, and an image signal processing method.

2. Description of the Related Art

JP-A-2005-20761 discloses an image signal processing apparatus that carries out a resolution enhancement process of inputted image signals (super resolution image processing).

However, there is a fear that high quality and highly resolved images processing can not be obtained when carrying out resolution enhancement processing for image signals inputted from an interlace-to-progressive conversion circuit. In the image signals in which an interpolation process for dynamic images has been carried out by the interlace-to-progressive conversion circuit, interpolated signals deteriorate in comparison with the original image signals. Therefore, where the image signals in which an interpolation process for dynamic images has been carried out are used as the original image signals for a resolution enhancement process, it is not possible to obtain sharp image signals due to influence of deteriorated signals.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Figure 1:
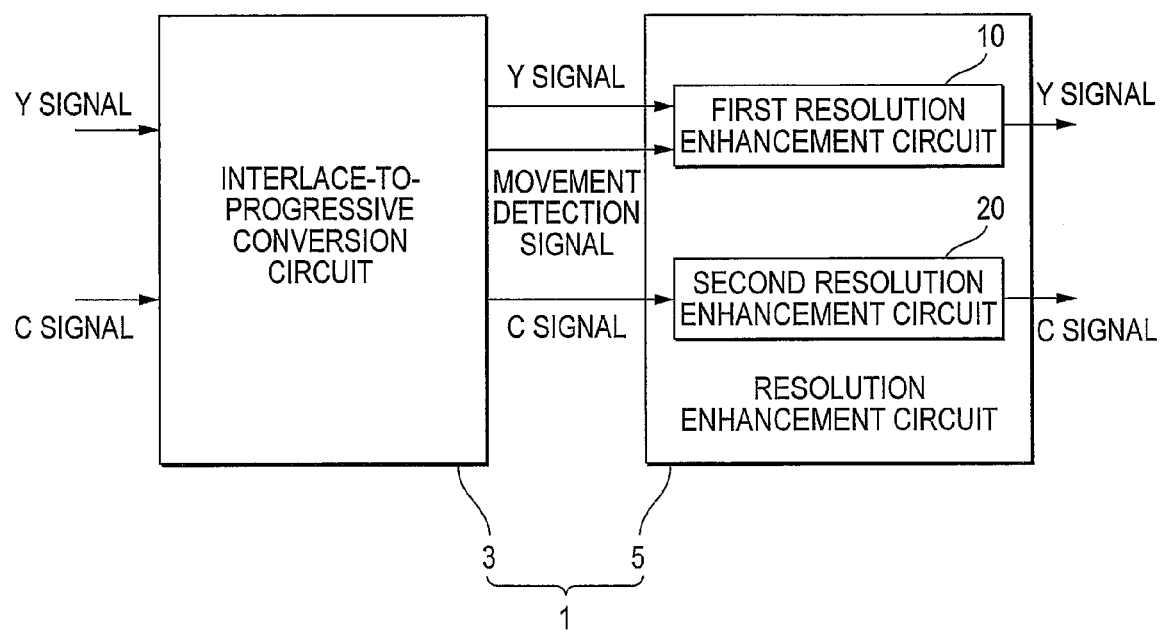
FIG. 1 is an exemplary block diagram showing a configuration of an image signal processing apparatus according to an embodiment of the present invention.

Various embodiments according to the invention will be described hereinafter with reference to the accompanying drawings. In general, according to one embodiment of the invention, there is provided According to an aspect of the present invention there is provided an image signal processing apparatus including an interlace-to-progressive conversion circuit and a resolution enhancement circuit. The interlace-to-progressive conversion circuit outputs first signals by performing an interlace-to-progressive conversion process on image signals. The resolution enhancement circuit outputs second signals by performing a resolution enhancement process on the first signals. The resolution enhancement circuit performs the resolution enhancement process not on the first signals on which an interpolation process for dynamic images have been performed.

Hereinafter, a description is given of a preferred embodiment of the present invention with reference to the accompanying drawings. To facilitate understanding of the description, components that are identical to each other in the respective drawings are given the same reference numerals whenever possible, wherein overlapping description thereof is omitted.

Referring to FIG. 1, a description is given of a structure of an image signal processing apparatus 1 according to the present embodiment. FIG. 1 is an exemplary block diagram showing the structure of the image signal processing apparatus 1 according to the present embodiment. The image signal processing apparatus 1 is provided with an interlace-to-progressive conversion circuit 3 and a resolution enhancement circuit 5.

The interlace-to-progressive conversion circuit 3 carries out an interlace-to-progressive conversion process. That is, the circuit 3 determines dynamic images and still images by detecting movements of images in inputted images (Brightness signal (Y signal) and color difference signal (C signal)), wherein, when still images are determined, an interpolation process for still images is carried out, and when dynamic images are determined, an interpolation process for dynamic images is carried out. The interlace-to-progressive conversion circuit 3 outputs image signals (Y signals and C signal), in which an interlace-to-progressive conversion process has been carried out, to the resolution enhancement circuit 5. Herein, the image signals (Y signals and C signals) outputted from the interlace-to-progressive conversion circuit 3 are image signals (Y signals and C signals) of low resolution.

Where the image signals outputted from the interlace-to-progressive conversion circuit 3 are determined to be still images, the image signals include original image signals inputted into the interlace-to-progressive conversion circuit 3 and image signals in which an interpolation process for still images has been carried out. Image signals of different fields in the original image signals inputted in the interlace-to-progressive conversion circuit 3 are employed for the image signals in which an interpolation process for still images has been carried out.

On the other hand, where determined to be dynamic images, the image signals outputted from the interlace-to-progressive conversion circuit 3 include original image signals inputted into the interlace-to-progressive conversion circuit 3 and image signals in which an interpolation process for dynamic images has been carried out. The image signals in which an interpolation process for dynamic signals are obtained by calculations from image signals between fields in the original image signals are inputted into the interlace-to-progressive conversion circuit 3. Thus, since the image signals in which an interpolation process for dynamic images has been carried out are obtained by calculations, the image signals deteriorate in comparison with the image signals in which an interpolation process for still images has been carried out, wherein the reliability of signals is low.

The interlace-to-progressive conversion circuit 3 outputs the above-described results of determination for dynamic images and still images as movement detection signals. The movement detection signals outputted from the interlace-to-progressive conversion circuit 3 are inputted into the resolution enhancement circuit 5.

The resolution enhancement circuit 5 performs the resolution enhancement process on the image signals (Y signals and C signals) inputted from the interlace-to-progressive conversion circuit 3, and outputs the image signals (Y signals and C signals) that were subjected to the resolution enhancement process. Herein, the image signals (Y signals and C signals) outputted from the resolution enhancement circuit 5 are image signals (Y signals and C signals) of high resolution.

The resolution enhancement circuit 5 includes a first resolution enhancement circuit 10 for processing Y signals of low resolution to high resolution, and a second resolution enhancement circuit 20 for processing C signals of low resolution to high resolution.

Figure 2:
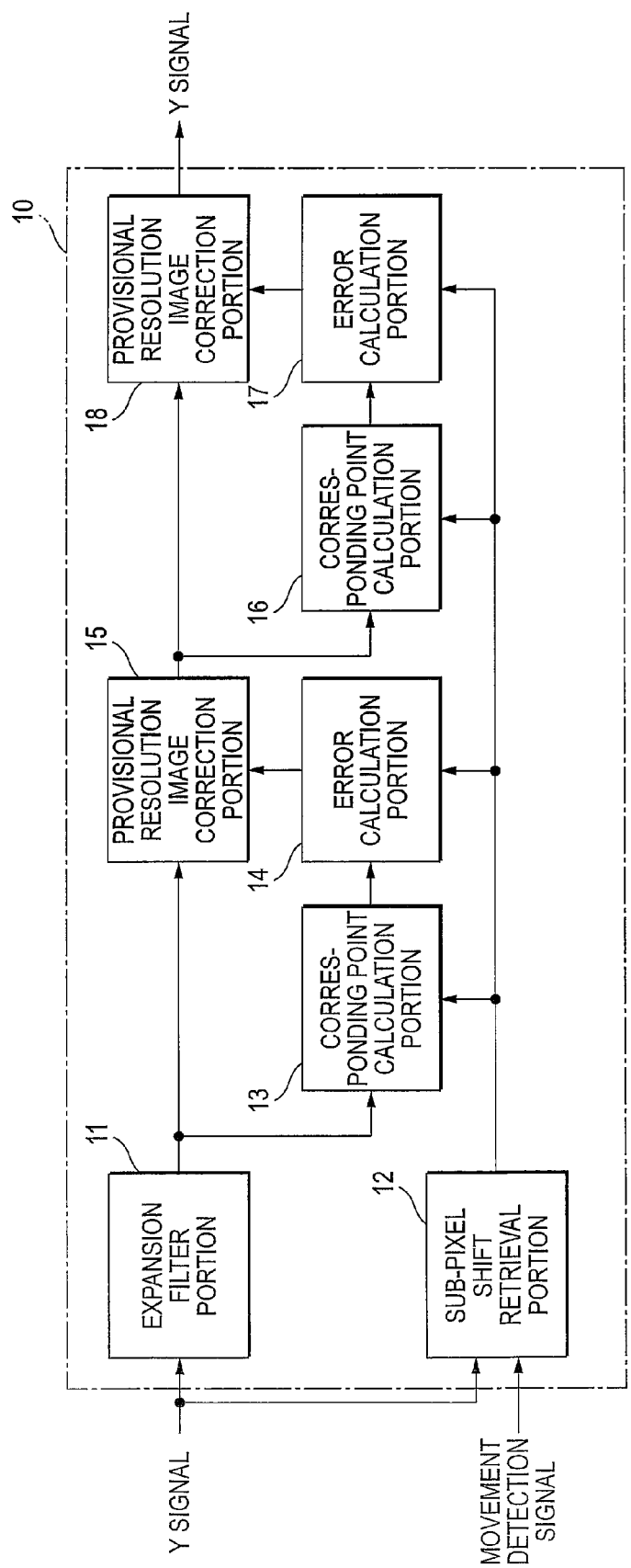
FIG. 2 is an exemplary block diagram describing a configuration of the first resolution enhancement circuit.

FIG. 2 is an exemplary block diagram describing a configuration of the first resolution enhancement circuit 10. The first resolution enhancement circuit 10 is provided, as shown in FIG. 2, with an expansion filter portion 11, a sub-pixel shift retrieval portion 12, corresponding point calculation portions 13 and 16, error calculation portions 14 and 17, and provisional resolution image correction portions 15 and 18.

The expansion filter portion 11 expands image signals, which are inputted from the interlace-to-progressive conversion circuit 3, by a scaling filter process. Accordingly, image signals (Y signals) of low resolution will be converted to image signals (Y signals) that are provisionally highly resolved. The expansion filter portion 11 outputs the provisionally highly resolved image signals (image signals of provisional high resolution) to the corresponding point calculation portion 13 and the provisional resolution image correction portion 15.

The sub-pixel shift retrieval portion 12 first detects autocorrelation of images in those of low resolution based on the image signals (Y signals) inputted from the interlace-to-progressive conversion circuit 3. And, the sub-pixel shift retrieval portion 12 obtains a sub-pixel shift from the detection result of autocorrelation of the images in those of low resolution, and outputs a self-coalesce corresponding point. The sub-pixel shift retrieval portion 12 outputs the self-coalesce corresponding point to the corresponding point calculation portion 13 and the error calculation portion 14.

Herein, the sub-pixel shift retrieval portion 12 selects original image signals for sub-pixel shift based on the movement detection signals outputted from the interlace-to-progressive conversion circuit 3. That is, the sub-pixel shift retrieval portion 12 determines, based on the movement detection signal inputted from the interlace-to-progressive conversion circuit 3, whether the image signals inputted from the interlace-to-progressive conversion circuit 3 include image signals in which an interpolation process for dynamic images has been carried out.

And, the sub-pixel shift retrieval portion 12 does not use the image signals, in which an interpolation process for dynamic images has been carried out, as original image signals for sub-pixel shift when the image signals inputted from the interlace-to-progressive conversion circuit 3 include the image signals in which an interpolation process for dynamic images has been carried out. At this time, the sub-pixel shift retrieval portion 12 uses the image signals inputted from the interlace-to-progressive conversion circuit 3, that is, the image signals (original image signals for an interlace-to-progressive conversion process) inputted into the interlace-to-progressive conversion circuit 3 and the image signals, in which an interpolation process for still images has been carried out, as the original image signals for sub-pixel shift.

On the other hand, when the image signals inputted from the interlace-to-progressive conversion circuit 3 includes image signals in which an interpolation process for still images has been carried out, the sub-pixel shift retrieval portion 12 uses image signals inputted from the interlace-to-progressive conversion circuit 3, that is, image signals inputted into the interlace-to-progressive conversion circuit 3 and image signals, in which an interpolation process for still images has been carried out, as original image signals for a resolution enhancement process.

Outputs from the expansion filter portion 11 and the sub-pixel shift retrieval portion 12 are inputted into the corresponding point calculation portion 13. The corresponding point calculation portion 13 calculates, by a weighting addition computation, the point corresponding to the self-coalesce corresponding point from provisional high resolution images based on the image signals (Provisional high resolution image signals) inputted from the expansion filter portion 11. The corresponding point calculation portion 13 outputs the result of calculation (point corresponding to the self-coalesce corresponding point) to the error calculation portion 14.

Outputs from the corresponding point calculation portion 13 and the sub-pixel shift retrieval portion 12 are inputted into the error calculation portion 14. The error calculation portion 14 calculates an error between the point corresponding to the self-coalesce corresponding point, which is outputted from the corresponding point calculation portion 13, and the self-coalesce corresponding point outputted from the sub-pixel shift retrieval portion 12. The error calculation portion 14 outputs the result (the above-described error) of calculation to the provisional resolution image correction portion 15.

Outputs from the expansion filter portion 11 and the error calculation portion 14 are inputted into the provisional resolution image correction portion 15. The provisional resolution image correction portion 15 corrects the images signals (Provisional high resolution image signals) inputted from the expansion filter portion 11 based on the above-described error calculated by the error calculation portion 14. The provisional resolution image correction portion 15 outputs the corrected image signals (Provisional high resolution image signals) to the corresponding point calculation portion 13 and the provisional resolution image correction portion 15.

As in the above-described corresponding point calculation portion 13, the corresponding point calculation portion 16 calculates, by a weighting addition computation, the point corresponding to the self-coalesce corresponding point from provisional high resolution images based on the image signals (Provisional high resolution image signals) inputted from the provisional resolution image correction portion 15. The corresponding point calculation portion 16 outputs the result (the point corresponding to the self-coalesce corresponding point) to the error calculation portion 17.

As in the above-described error calculation portion 14, the error calculation portion 17 calculates an error between the point corresponding to the self-coalesce corresponding point outputted from the corresponding point calculation portion 16 and the self-coalesce corresponding point outputted from the sub-pixel shift retrieval portion 12. The error calculation portion 17 outputs the result (the above-described error) of calculation to the provisional resolution image correction portion 18.

As in the above-described provisional resolution image correction portion 15, the provisional resolution image correction portion 18 corrects the image signals (Provisional high resolution image signals) inputted from the provisional resolution image correction portion 15 based on the above-described error calculated by the error calculation portion 17.

As described above, the first resolution enhancement circuit 10 repeats a series of processes of the corresponding point calculation, error calculation and correction of provisional high resolution images several times (two times in the present embodiment), and obtains image signals (Y signals) of sharpened high resolution. The first resolution enhancement circuit 10 outputs the high resolution image signals (Y signals) thus obtained.

The second resolution enhancement circuit 20 converts the image signals (C signals) inputted from the interlace-to-progressive conversion circuit 3 in terms of linear HD (High Definition). The second resolution enhancement circuit 20 outputs the image signals (C signals), which were subjected to linear HD conversion, as high resolution image signals (C signals).

As described above, in the present embodiment, the sub-pixel shift retrieval portion 12 does not use the image signals, in which an interpolation process for dynamic images has been carried out, as original image signals for sub-pixel shift when the image signals inputted from the interlace-to-progressive conversion circuit 3 include image signals in which an interpolation process for dynamic images. That is, the resolution enhancement circuit 5 (the first resolution enhancement circuit 10) does not use the image signals, in which an interpolation process for dynamic images has been carried out, for a resolution enhancement process. Therefore, it will be possible to obtain sharp image signals as high resolution image signals. As a result, with the image signal processing apparatus 1, it is possible to obtain high-quality and high-resolution images.

Figure 3:
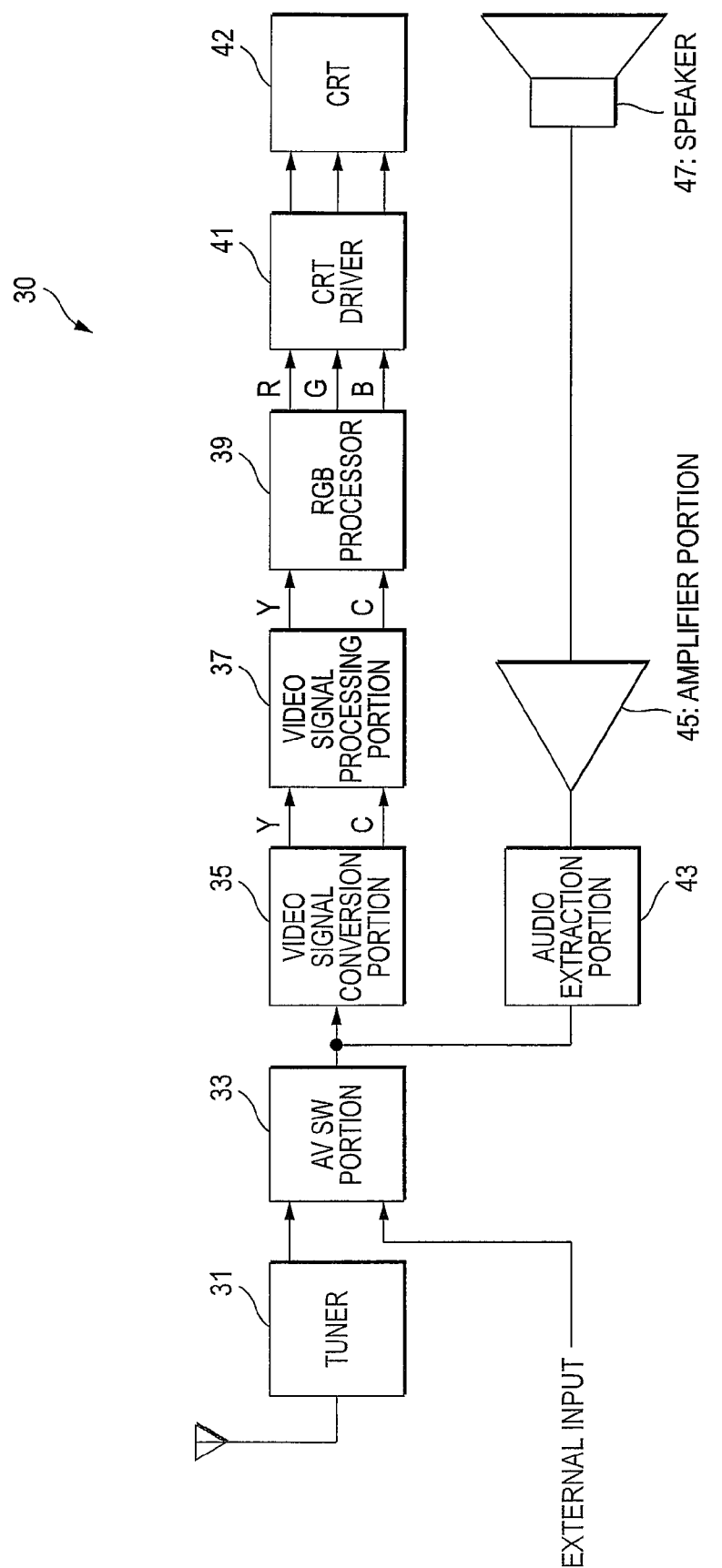
FIG. 3 is an exemplary block diagram showing a television set equipped with an image signal processing apparatus according to an embodiment of the present invention.

Subsequently, referring to FIG. 3, a description is given of one example of a television set 30 (image display apparatus) provided with the above-described image signal processing apparatus 1. FIG. 3 is an exemplary block diagram showing one example of a television set provided with the above-described image signal processing apparatus 1 according to the present embodiment.

The television set 30 is provided with a tuner 31, to which broadcasting signals are supplied from an antenna element, for outputting audiovisual signals by demodulating the same, and an AV switch (SW) portion 33, to which the audiovisual signals are supplied, for carrying out switching with an external input, and a video signal conversion portion 35 that, when video signals are supplied thereto, carries out a predetermined video signal process, converts the same to Y signals and color difference signals, and outputs the same. The television set further includes an audio extraction portion 43 for separating audio signals from audiovisual signals, and an amplification portion 45 for appropriately amplifying the audio signals and supplying the same to the speaker 47.

Herein, the above-described image signal processing apparatus 1 is applied to the image signal processing portion 37 to which video signals are supplied from the video signal conversion portion 35. Non-interlaced video signals are divided into RGB signals by an RGB processor 39, appropriately amplified by a CRT driver 41 and are displayed in a CRT 42 as a video.

Thus, the invention is not limited to the embodiments without modification. The invention can be implemented by modifying composite elements of embodiments without departing from the spirit and scope of the invention. Additionally, the invention can be variously implemented by appropriately combining a plurality of composite elements of the embodiments with one another, which are described in the foregoing description thereof. For example, some of the composite elements can be omitted among all the composite elements of the embodiments. Additionally, the composite elements, each of which is provided in different ones of the embodiments, can be appropriately combined with one another.

What is claimed is:

1. An image signal processing apparatus comprising:
   an interlace-to-progressive conversion circuit configured to:
      output first output image signals by performing an interlace-to-progressive conversion process on input image signals,
      determine whether the input image signals are still images or dynamic images and output movement detection signals indicating a determination result,
      perform a dynamic-image-dedicated interpolation process on the input image signals when the input image signals are determined to be the dynamic images, and
      perform a still-image-dedicated interpolation process on the input image signals when the input image signals are determined to be the still images; and
   a resolution enhancement circuit configured to:
      receive the first output image signals and the movement detection signals from the interlace-to-progressive conversion circuit, and
      output second output image signals by performing a resolution enhancement process on the first output image signals, while omitting the input image signals to which the dynamic-image-dedicated interpolation process has been performed from a subject of the resolution enhancement process.

2. The image signal processing apparatus according to claim 1, wherein the interlace-to-progressive conversion circuit is further configured to:
   determine whether the image signals are still images or the dynamic images by detecting movements of the image signals,
   perform a first interpolation process that is the interpolation process for the dynamic images when the image signals are determined to be the dynamic images,
   perform a second interpolation process that is an interpolation process for the still images when the image signals are determined to be the still images, and
   output movement detection signals that indicates a result of a determination of the still images or the dynamic images; and
   wherein the resolution enhancement circuit is further configured to determine whether or not the interpolation process for dynamic images have been performed on the first signals based on the movement detection signals.

3. The image signal processing apparatus according to claim 1, wherein the resolution enhancement circuit performs the resolution enhancement process by using (1) the image signals and (2) the first signals on which an interpolation process for sill images have been performed.

4. The image signal processing apparatus according to claim 1, wherein the resolution enhancement circuit performs the resolution enhancement process on the first signals on which an interpolation process for still images have been performed.

5. The image signal processing apparatus according to claim 1, wherein:
   the resolution enhancement circuit includes a sub-pixel shift retrieval portion that obtains a sub-pixel shift from an autocorrelation detected from the first signals by performing a sub-pixel shift process; and
   the sub-pixel shift retrieval portion performs the sub-pixel shift process not on the first signals on which the interpolation process for dynamic images have been performed.

6. The image signal processing apparatus according to claim 5, wherein:

the sub-pixel shift retrieval portion performs the sub-pixel shift process by using (1) the image signals and (2) the first signals on which an interpolation process for sill images have been performed.

7. The image signal processing apparatus according to claim 5, wherein the sub-pixel shift retrieval portion performs the sub-pixel shift process on the first signals on which an interpolation process for still images have been performed.

8. An image display apparatus comprising:
an interlace-to-progressive conversion circuit configured to:
output first output image signals by performing an interlace-to-progressive conversion process on input image signals,
determine whether the input image signals are still images or dynamic images and output movement detection signals indicating a determination result,
perform a dynamic-image-dedicated interpolation process on the input image signals when the input image signals are determined to be the dynamic images, and
perform a still-image-dedicated interpolation process on the input image signals when the input image signals are determined to be the still images; and
a resolution enhancement circuit configured to:
receive the first output image signals and the movement detection signals from the interlace-to-progressive conversion circuit, and
output second output image signals by performing a resolution enhancement process on the first output image signals, while omitting the input image signals to which the dynamic-image-dedicated interpolation process has been performed from a subject of the resolution enhancement process; and
a display unit that displays images based on the second output signals.

9. An image signal processing method for processing image signals, the method comprising:
outputting first output image signals by performing an interlace-to-progressive conversion process on input image signals;
determine whether the input image signals are still images or dynamic images;
outputting movement detection signals indicative of a determination result;
performing a dynamic-image-dedicated interpolation process on the input image signals when the input image signals are determined to be the dynamic images;
performing a still-image-dedicated interpolation process on the input image signals when the input image signals are determined to be the still images; and
outputting second signals by performing a resolution enhancement process on the first output image signals
wherein, the resolution enhancement process is not performed on the first signals on which an interpolation process for dynamic images have been performed.

* * * * *